United States Patent
Ando et al.

(10) Patent No.: US 8,533,300 B2
(45) Date of Patent: Sep. 10, 2013

(54) STORAGE DEVICE, CONTROLLER, AND ADDRESS MANAGEMENT METHOD

(75) Inventors: Shun Ando, Kahoku (JP); Yuji Noda, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 13/342,630

(22) Filed: Jan. 3, 2012

(65) Prior Publication Data
US 2012/0239789 A1 Sep. 20, 2012

(30) Foreign Application Priority Data
Mar. 16, 2011 (JP) .................. 2011-058487

(51) Int. Cl.
*G06F 15/16* (2006.01)
(52) U.S. Cl.
USPC .............................. 709/220; 710/9
(58) Field of Classification Search
USPC ............... 709/200–202, 220–227; 710/2, 710/8, 9
See application file for complete search history.

(56) References Cited

U.S. PATENT DOCUMENTS

| | | | | |
|---|---|---|---|---|
| 6,532,233 | B1 * | 3/2003 | Matsunaga et al. | 370/390 |
| 7,515,549 | B2 * | 4/2009 | Wing et al. | 370/252 |
| 7,912,992 | B2 | 3/2011 | Suzuki | |
| 2003/0154285 | A1 * | 8/2003 | Berglund et al. | 709/227 |

FOREIGN PATENT DOCUMENTS

| | | |
|---|---|---|
| JP | 2005-310046 A | 11/2005 |
| JP | 2008-197780 A | 8/2008 |

* cited by examiner

*Primary Examiner* — Moustafa M Meky
*(74) Attorney, Agent, or Firm* — Fujitsu Patent Center

(57) ABSTRACT

A storage device has a wide link in which any one of addresses that a server has is assigned to a plurality of ports that are connected to the server. A change detecting unit detects a change in the state of any port of the ports. When a change is detected, an address acquiring unit acquires the addresses that are assigned to the ports. An address expecting unit and a physical-address acquiring unit, in accordance with the acquired addresses and with identification information for identifying the ports, manage addresses that the plurality of connection-ports-connected-server can possibly have.

5 Claims, 9 Drawing Sheets

TO SAS SWITCH

TO SAS SWITCH

STORAGE DEVICE, CONTROLLER, AND ADDRESS MANAGEMENT METHOD

CROSS-REFERENCE TO RELATED APPLICATION

This application is based upon and claims the benefit of priority of the prior Japanese Patent Application No. 2011-058487, filed on Mar. 16, 2011, the entire contents of which are incorporated herein by reference.

FIELD

The embodiment discussed herein is directed to a storage device, etc.

BACKGROUND

A SAS (Serial Attached SCSI) wide link is an input/output interface that connects an HBA (Host Bus Adapter) of a host to a storage device. A SAS wide link is a set of standards that allow a plurality of SASs, each assigned with the same SAS address, to operate as one logical port. A SAS wide link can fall into one of two categories: a static-address assigning type, in which an HBA assigns a SAS address statically; and a wide/narrow type, in which an HBA assigns a SAS address that is available for both a wide link and a narrow link.

FIG. 9A is diagram that illustrates a static-address assigning HBA. As illustrated in FIG. 9A, an HBA mounted on a host assigns a static SAS address A0 to a wide link having four SASs. When an input/output request is sent to a storage device, the host outputs the SAS address A0, which is assigned by the HBA and is an address that is used for identifying the host, to a SAS switch (Expander).

FIG. 9B is diagram that illustrates a wide/narrow HBA. As illustrated in FIG. 9B, when in narrow link mode, an HBA mounted on a host assigns pre-assigned SAS addresses A1 to A4 to four SASs, respectively. When in wide link mode, the HBA mounted on the host assigns any one of the pre-assigned four SAS addresses A1 to A4 that are used in narrow link mode to the wide link. When an input/output request is sent to a storage device, the host outputs the SAS address that is assigned by the HBA to a SAS switch as an address that is used for identifying the host. Depending on the HBA, a SAS address that is assigned by the HBA can be changed as the result of an action, such as the detachment or attachment of a cable.

When a SAS address of an HBA is changed as the result of an action, such as the detachment or attachment of a cable, a problem occurs in that a storage device cannot respond to the changed SAS address. In other words, when a host uses a changed SAS address as an address that is used for identifying the host to send an input/output request to a storage device, the storage device cannot recognize the SAS address.

According to an aspect of the storage device of the present invention, even when an HBA address has been changed as the result of an action, such as the detachment or attachment of a cable, the storage device can still respond to the changed address.

SUMMARY

According to an aspect of an embodiment of the invention, a storage device that has a wide link in which any one of addresses that a server has is assigned to a plurality of connection ports that are connected to the server, the storage device includes: a detecting unit that detects a change in the state of any port of the connection ports; an address acquiring unit that acquires, when a change is detected by the detecting unit, addresses that are assigned to the connection ports; and an address management unit that manages, in accordance with the addresses acquired by the address acquiring unit and with identification information for identifying the connection ports, an address that the plurality of connection-ports-connected-server can possibly have.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

In the following embodiments, a wide/narrow-type SAS (Serial Attached SCSI) wide link is used in a storage device. It should be noted that the present invention is not limited to the following embodiments.

Configuration of Storage Device According to an Embodiment

Figure 1:
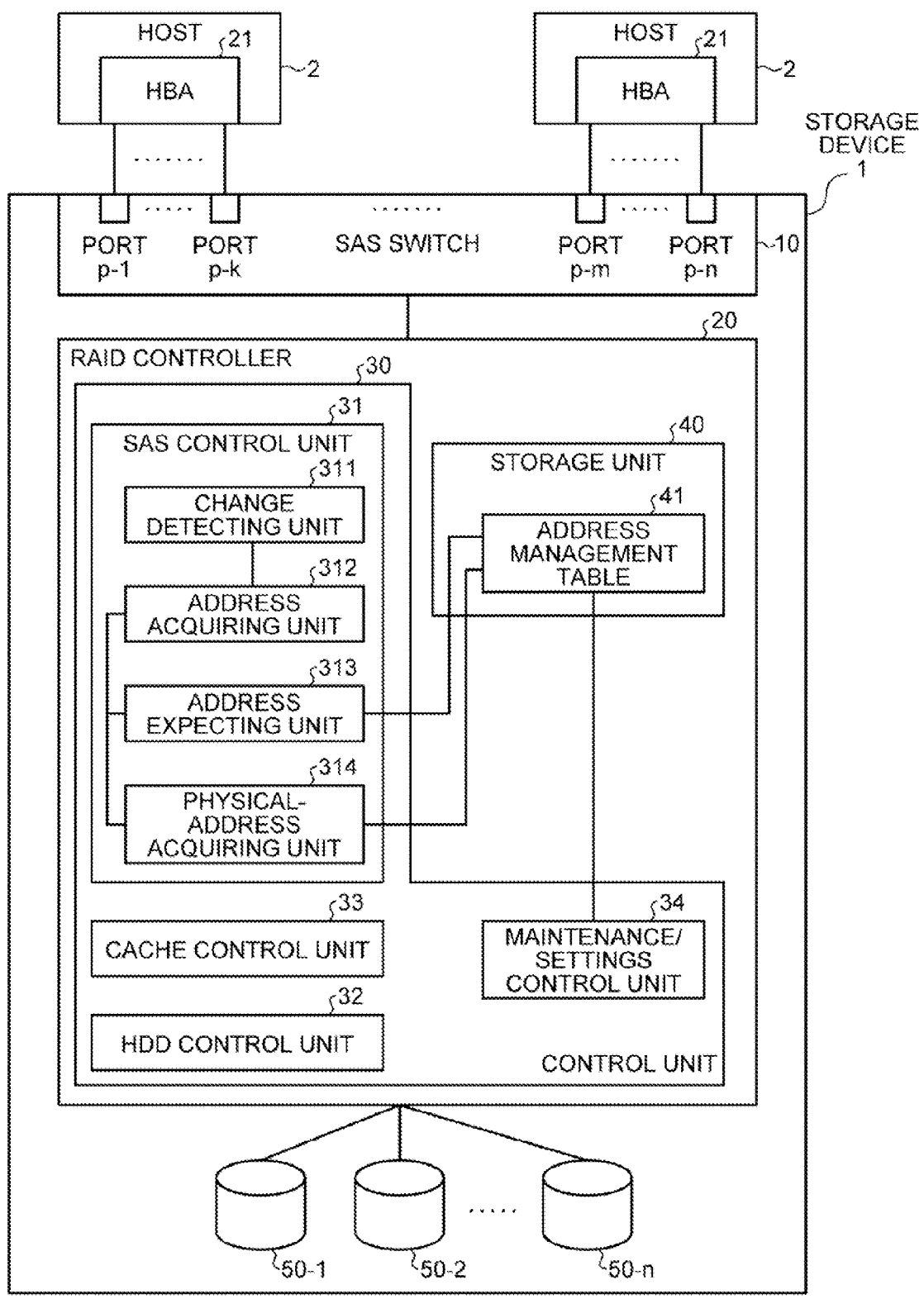
FIG. 1 is a functional block diagram of the configuration of a storage device according to an embodiment.

FIG. 1 is a functional block diagram of the configuration of a storage device according to an embodiment. As illustrated in FIG. 1, a storage device 1 includes a SAS switch 10, a RAID controller 20, and HDDs (Hard Disk Drives) 50-1 to 50-n. The storage device 1 has a SAS wide link mounted thereon in which any one of SAS addresses that a given host of hosts 2, which are higher-level devices of the storage device 1, has is assigned to some physical ports (PHY: physical layer) of the SAS switch 10.

The SAS switch 10 is an expander that relays input/output data between higher-level devices or the hosts 2 and the RAID controller 20. The SAS switch 10 connects each of the hosts 2 to the RAID controller 20 by using the SAS wide link. The SAS switch 10 has a plurality of ports p (p-1 to p-n) (n>1). An HBA (Host Bus Adapter) 21 of each of the hosts 2 assigns any one of pre-assigned SAS addresses to the wide link. The assigned SAS address is assigned to some of the ports p (p1 to pn) of the SAS switch 10. For example, a SAS address that is assigned by the HBA 21 of a given host of the hosts 2 is assigned to each of the ports p-1 to p-k (1<k<n) of the SAS switch 10.

Upon receiving, from any of the hosts 2, an input/output request that includes the SAS address that is assigned by the HBA 21, the SAS switch 10 outputs the acquired input/output request to the RAID controller 20. The RAID controller 20 identifies the host 2, which is the requester of the input/output request, by the SAS address that is included in the input/output request.

When the state of a port p is changed, the SAS switch 10 sends a broadcast to the RAID controller 20. The SAS switch 10 sends a predetermined broadcast, for example, a broadcast change primitive to the RAID controller 20 to notify that the state of the port p has been changed. The state of a port p is changed when, for example, a new cable is attached to the port p that is unused, i.e., a new HBA is added onto a SAS topology. The state of a port p is also changed when, for example, a cable is detached from the port p that is used, i.e., the HBA 21 performs SAS address reassignment. When the SAS switch 10 sends a broadcast to the RAID controller 20, the RAID controller 20 performs a later-described address management process.

The RAID controller 20 includes a control unit 30 and a storage unit 40. The control unit 30 includes a SAS control unit 31, an HDD control unit 32, a cache control unit 33, and a maintenance/settings control unit 34. The control unit 30 is, for example, an integrated circuit, such as an ASIC (Application Specific Integrated Circuit) and an FPGA (Field Programmable Gate Array), or an electric circuit, such as a CPU (Central Processing Unit) and an MPU (Micro Processing Unit).

The storage unit 40 includes an address management table 41. The storage unit 40 is, for example, a semiconductor memory chip, such as a RAM (Random Access Memory) and a flash memory, or a storage device, such as a hard disk and an optical disk. The address management table 41 stores therein SAS addresses that can possibly be assigned to the ports (PHYs) p that are connected to the hosts 2 and also stores therein identifiers of the ports p. The configuration of the address management table 41 will be explained later.

The SAS control unit 31 manages SAS addresses that are used for identifying the hosts 2, while controlling the SAS wide link via the SAS switch 10. The SAS control unit 31 includes a change detecting unit 311, an address acquiring unit 312, an address expecting unit 313, and a physical-address acquiring unit 314.

The change detecting unit 311 detects a change in the state of a given port p that is included in the ports p of the SAS switch 10. When, for example, a new cable is attached to an unused port p or a cable is detached from a used port p, the change detecting unit 311 detects a broadcast change primitive that has been received from the SAS switch 10.

When the change detecting unit 311 detects a change in the state of a port p, the address acquiring unit 312 acquires SAS addresses that are assigned to the ports p. For example, when the change detecting unit 311 detects a broadcast, the address acquiring unit 312 performs a Discover process with the SAS switch 10. The address acquiring unit 312 then acquires SAS addresses of all the SAS devices or the HBAs 21 (the hosts 2) on the SAS topology. The function of the Discover process is defined in the SAS-1.1 specifications. The Discover process has the function of collecting information indicative of a device that is connected to a port p. For example, the address acquiring unit 312 acquires the identifier of the HBA 21 that is connected to each of the ports p, the identifier of each of the ports p, the SAS address assigned to each of the ports p.

The address expecting unit 313 and the physical-address acquiring unit 314 manage, in accordance with the SAS addresses and the identifiers of the ports p acquired by the address acquiring unit 312, SAS addresses that the hosts 2, which are connected to some ports p, can possibly have.

When a SAS address acquired by the address acquiring unit 312 is assigned to an unused port p, the address expecting unit 313 expects, in accordance with the SAS address, consecutive SAS addresses that the host 2 can possibly have. In other words, when a new HBA 21 is detected at an unused port p, the address expecting unit 313 expects, in accordance with the SAS address that is assigned to the port p, consecutive SAS addresses that the host 2 can possibly have.

For example, the address expecting unit 313 determines, by using the address management table 41 stored in the storage unit 40, whether the identifier of any port p that has a SAS address assigned therewith is stored in the address management table 41. If it is determined that the identifier of a port p that has a SAS address assigned therewith is not stored in the address management table 41, the HBA 21 (target HBA) that is connected to the port p is determined to be a new HBA. The address expecting unit 313 then calculates consecutive values of the SAS address that can possibly be assigned to the same HBA 21. For example, the address expecting unit 313 manages, by using the address management table 41, 16 consecutive values (0000 to 1111) that correspond to the lower 4 bits of the SAS address as a group of the HBA 21. Although, in the above, the address expecting unit 313 calculates 16 consecutive values that correspond to the lower 4 bits of a SAS address, the configuration is not limited thereto. It is allowable to change the number of consecutive values depending on the vender of the HBA 21 and the type of the HBA 21. Moreover, for example, the address expecting unit 313 can be configured to receive the number of consecutive values as a user specified value.

When any unexpected SAS address that is assigned to a used port p is found in the SAS addresses acquired by the address acquiring unit 312, the physical-address acquiring unit 314 acquires, via the SAS switch 10, a plurality of SAS addresses physically assigned by the HBAs 21. The physical-address acquiring unit 314 then manages the acquired SAS addresses by using the address management table 41. An unexpected SAS address is a SAS address that is not included in the SAS addresses that are expected by the address expecting unit 313. As described above, SAS addresses that are expected by the address expecting unit 313 are consecutive SAS addresses that the host 2 can possibly have. An unexpected SAS address is a SAS address that is not included in these addresses, i.e., the consecutive addresses.

If, for example, the address expecting unit 313 determines that the identifier of a port p that has the SAS address assigned therewith is stored in the address management table 41, the physical-address acquiring unit 314 determines that the HBA 21 (target HBA) that is connected to the port p is not a new HBA. In other words, the physical-address acquiring unit 314 determines that the HBA 21 that is connected to the port p performs SAS address reassignment. The physical-address acquiring unit 314 then sets all the ports p assigned with the SAS address of the target HBA 21 to a quasi narrow link mode and then performs the Discover process sequentially. The physical-address acquiring unit 314 then acquires all the SAS addresses assigned to each of the ports p. The physical-address acquiring unit 314 manages all the acquired SAS addresses as a group of the HBA 21 by using the address management table 41.

The HDD control unit 32 controls accesses to HDDs 50-1 to 50-n. The cache control unit 33 controls caches that are used for accessing the HDDs 50-1 to 50-n through the HDD control unit 32.

The maintenance/settings control unit 34 maintains information stored in the address management table 41 to maintain SAS addresses that are used for identifying the hosts 2. For example, the maintenance/settings control unit 34 acquires, via a setting screen displayed on a monitor, a correspondence relation between SAS addresses that can possibly be assigned to the ports p that are connected to the hosts 2 and the identifiers of the ports p and sets the address management table 41 in accordance with the acquired correspondence relation.

Figure 2:
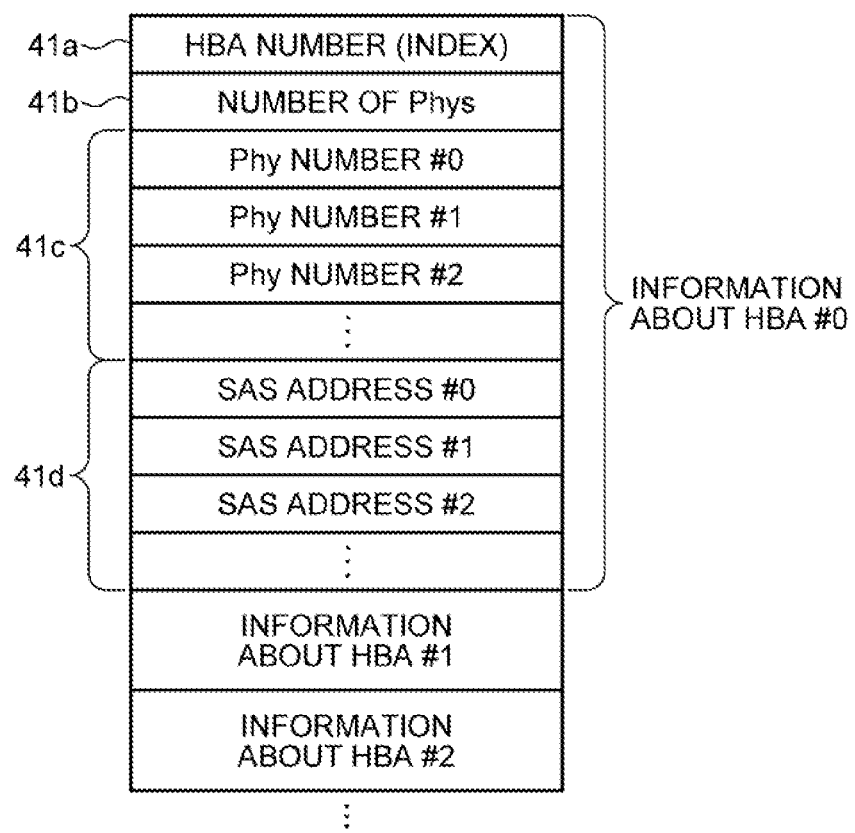
FIG. 2 is a table that illustrates the data structure of the address management table according to the embodiment

The data structure of the address management table 41 will be explained below with reference to FIG. 2. FIG. 2 is a table that illustrates the data structure of the address management table according to the embodiment. As illustrated in FIG. 2, the address management table 41 stores therein, with respect to each of HBA numbers (indexes) 41a, number of Phys 41b, Phy numbers 41c, and SAS addresses 41d in an associated manner. The identifiers of the HBAs 21 that are used for identifying the HBAs 21 (hosts) are stored in the HBA numbers (indexes) 41a. The number of ports (Phys) of the HBA 21 is stored in the number of Phys 41b. The identifiers of phys that are counted to the number indicated by the number of Phys 41b are stored in the Phy numbers 41c. N or less SAS addresses are stored in the SAS addresses 41d. N is, for example, 16, 32, or can be any value that is the maximum number of expectable SAS addresses.

The following is an example of the storage information based on the data structure of FIG. 2 when the address expecting unit 313 expects addresses from a SAS address A1 that is assigned by an HBA #0 and stores the expected addresses in the address management table 41. The HBA number 41a is "0", the number of Phys 41b is "4", the Phy numbers 41c are "0, 1, 2, and 3", and the SAS addresses 41d are 16 consecutive values including "A0, A1, ..., and Af". The following is an example of the storage information when SAS addresses that are physically assigned by the HBA #0 are stored by the physical-address acquiring unit 314 in the address management table 41. The SAS addresses 41d are "A1, B2, C3, and D4". The HBA number 41a, the number of Phys 41b, and the Phy numbers 41c are the same as those included in the storage information stored by the address expecting unit 313; therefore, the same description is not repeated.

Example of Possible Address Calculation

Figure 3:
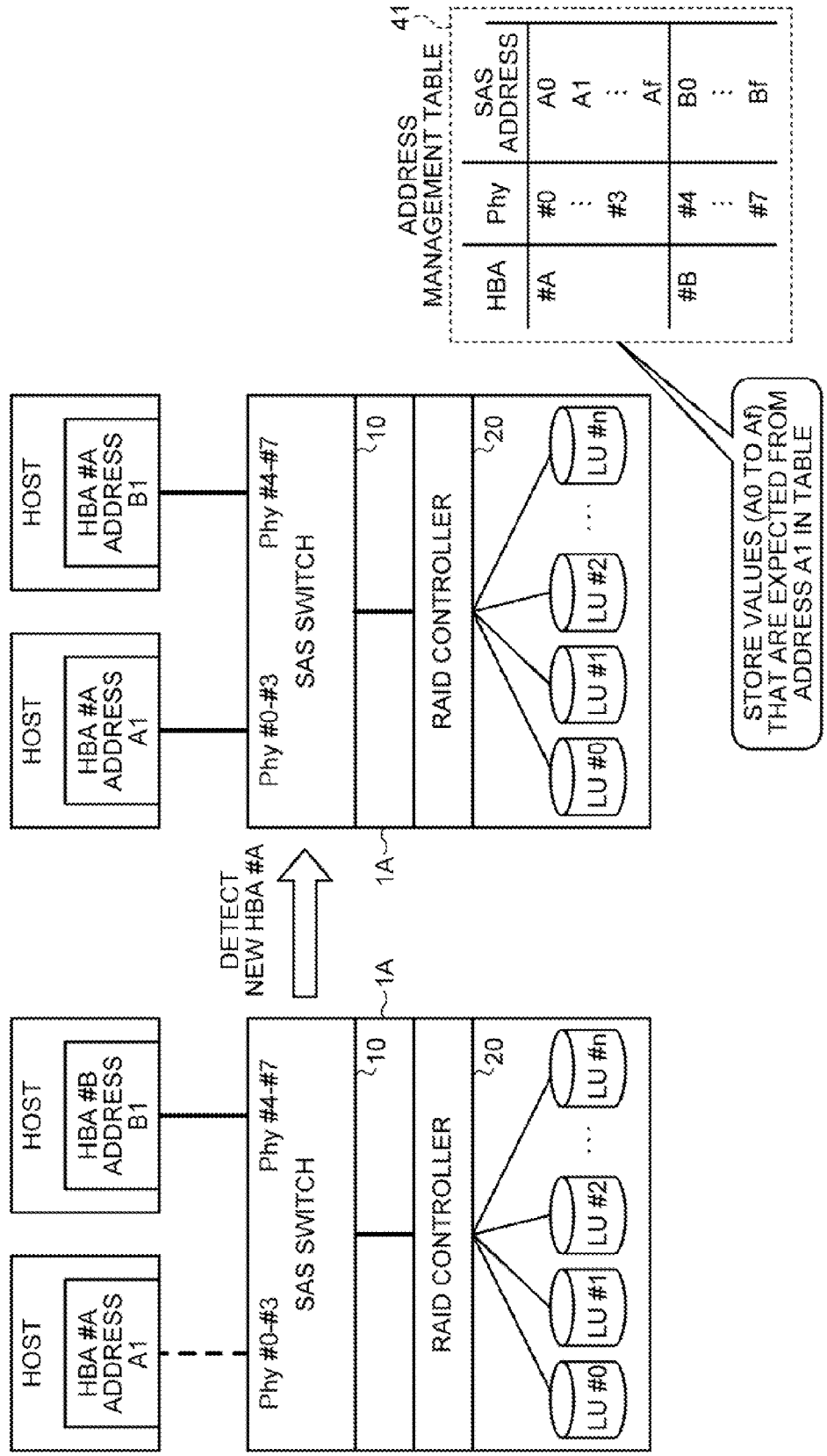
FIG. 3 is a diagram that illustrates an example of address expectation.

An example of address expectation performed by the address expecting unit 313 will be explained below with reference to FIG. 3. FIG. 3 is a diagram that illustrates an example of the address expectation. An HBA #A is tried to be connected to the SAS switch 10 through a wide link via the phys #0 to #3 of the SAS switch 10 and four cables. An HBA #B is currently connected to the SAS switch 10 through the wide link via the phys #4 to #7 of the SAS switch 10 and four cables.

As illustrated in FIG. 3, the new host or the HBA #A is connected to the Phys #0 to #3 of the SAS switch 10. Then, the RAID controller 20 detects a broadcast received from the SAS switch 10 and detects that the state of a given Phy included in the Phys of the SAS switch 10 has been changed. The RAID controller 20 performs the Discover process with the SAS switch 10 and acquires SAS addresses of all the HBAs on the SAS topology. In this example, the RAID controller 20 acquires, with respect to the HBA #A, the SAS address A1 that is assigned to the Phys #0 to #3 and, with respect to the HBA #B, the SAS address B1 that is assigned to the Phys #4 to #7.

Because the SAS address A1 is assigned to the Phys #0 to #3 that are unused, the address expecting unit 313 of the RAID controller 20 determines that the HBA #A, which is connected to the Phys #0 to #3, is a new HBA. The address expecting unit 313 then expects, by using the SAS address A1, consecutive SAS addresses that the HBA #A can possibly have. In this example, the address expecting unit 313 expects 16 consecutive values A0 to Af that correspond to the lower 4 bits of the SAS address A1. After that, the address expecting unit 313 stores the 16 consecutive values A0 to Af that are expected by using the SAS address A1 in the address management table 41. Therefore, even if the SAS address of the HBA #A is changed to any of the consecutive values later as the result of an action, such as the detachment or attachment of a cable, a storage device 1A can respond to the changed SAS address by referring to the SAS addresses stored in the address management table 41.

Because the SAS address B1 is assigned to the used Phys #4 to #7 and no change is found, the address expecting unit 313 does not perform any process with respect to the SAS address B1.

Example of Physical Address Acquisition

Figure 4:
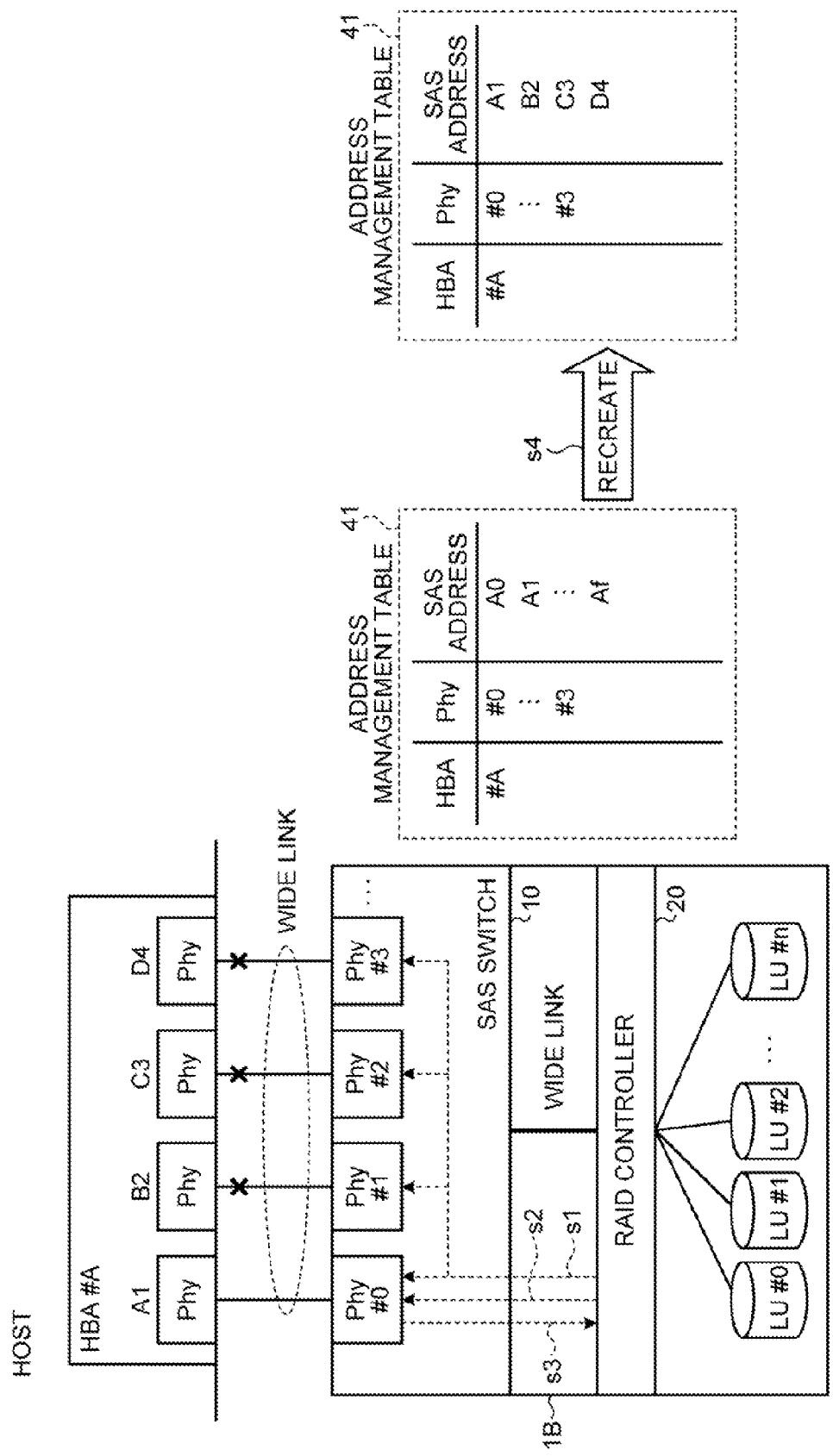
FIG. 4 is a diagram that illustrates an example of physical address acquisition.

An example of a physical address acquisition performed by the physical-address acquiring unit 314 will be explained below with reference to FIG. 4. FIG. 4 is a diagram that illustrates an example of the physical address acquisition. In the example of FIG. 4, the HBA #A performs SAS address reassignment as the result of an action, such as the detachment or attachment of a cable, and therefore the SAS address of a used Phy is changed to an unexpected SAS address.

In the above situation, the RAID controller 20 sets all the Phys assigned with the SAS address of the HBA #A to a quasi narrow link mode and then performs the Discover process sequentially. The reason for setting the wide link to a quasi narrow link is to acquire the actually assigned SAS address from each Phy of the SAS switch 10 one by one. More particularly, the physical-address acquiring unit 314 sets all the Phys #0 to #3, which are assigned with the SAS address of the HBA #A, to invalid (Disable) (s1).

Subsequently, the physical-address acquiring unit 314 sets the first Phy #0 to valid (Enable) (s2). The physical-address acquiring unit 314 then performs the Discover process with the valid Phy #0, thereby acquiring a SAS address that is assigned to the Phy #0 (s3). After that, the physical-address acquiring unit 314 repeats the process to acquire SAS addresses that are assigned to the other Phys #1 to #3. In this example, the physical-address acquiring unit 314 acquires SAS addresses A1, B2, C3, and D4 from the Phys #0 to #3, respectively.

When all the SAS addresses of the Phys (#0 to #3) are acquired, the physical-address acquiring unit 314 recreates the address management table 41 so that all the acquired SAS addresses are treated as a group of the HBA #A (s4). In this example, the physical-address acquiring unit 314 recreates the address management table 41 so that expected consecutive SAS addresses A0 to Af of the HBA #A are replaced with the SAS addresses A1, B2, C3, and D4. Therefore, even if the SAS address of the HBA #A is changed to any of the SAS addresses A1, B2, C3, and D4 later as the result of an action, such as the detachment or attachment of a cable, a storage device 1B can respond to the changed SAS address by referring to the SAS addresses stored in the address management table 41.

Address Management Process According to the Embodiment

Figure 5:
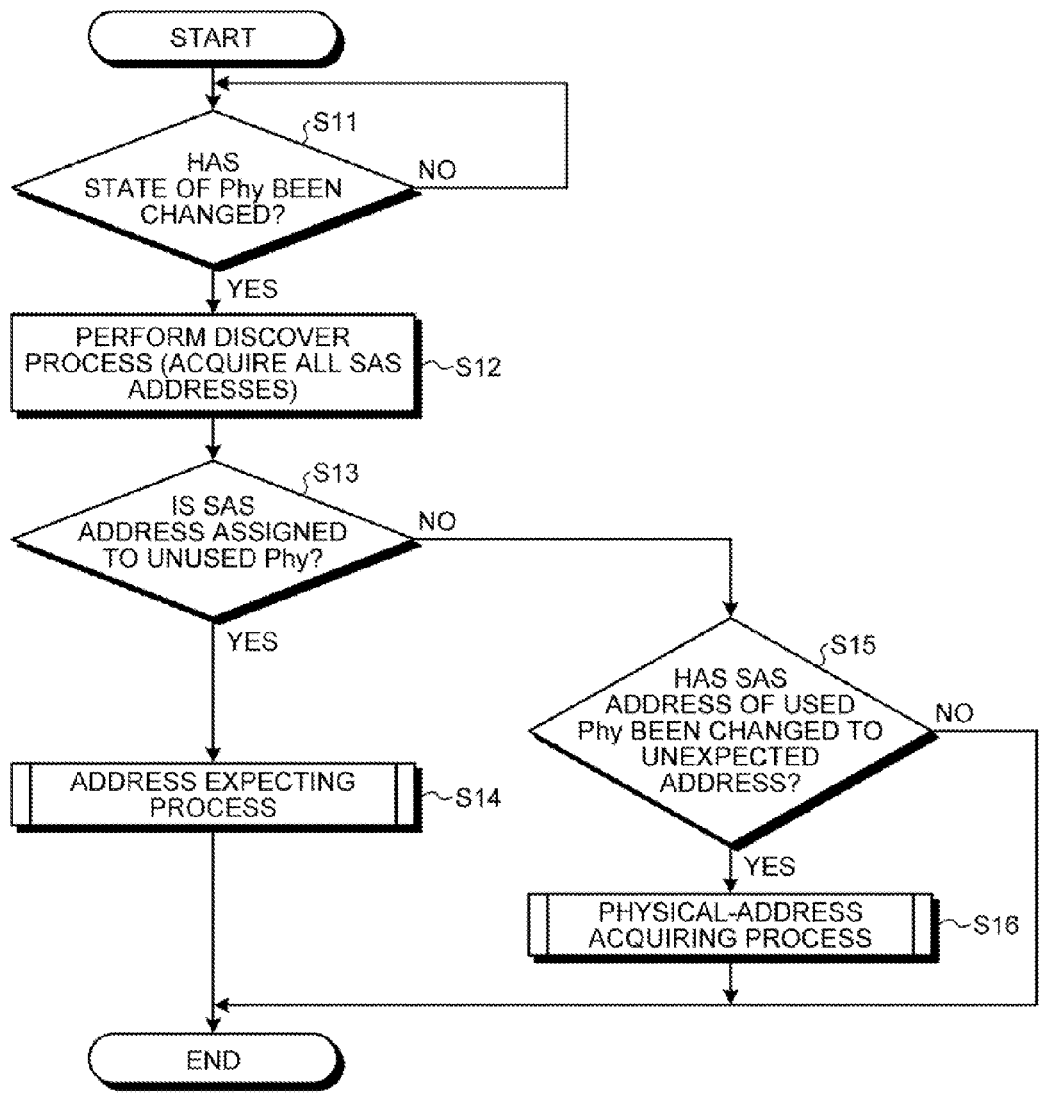
FIG. 5 is a flowchart of an address management process according to the embodiment.

The address management process will be explained below with reference to FIG. 5 according to the embodiment. FIG. 5 is a flowchart of an address management process according to the embodiment.

Firstly, the change detecting unit 311 determines whether the state of any of the Phys of the SAS switch 10 has been changed (Step S11). If it is determined that the state of any Phy has not been changed (Step S11; No), the change detecting unit 311 repeats the determining process.

If it is determined that the state of any Phy has been changed (Step S11; Yes), the address acquiring unit 312 performs the Discover process with the SAS switch 10 (Step S12). As a result, the address acquiring unit 312 acquires SAS addresses of all the HBAs 21 on the SAS topology.

The address expecting unit 313 then determines whether a SAS address acquired by the address acquiring unit 312 is assigned to an unused Phy (Step S13). In other words, the address expecting unit 313 determines whether a new HBA 21 is detected at an unused Phy. For example, the address expecting unit 313 determines, by using the address management table 41, whether the identifier of any Phy that has a SAS address assigned therewith is stored in the address management table 41.

If it is determined that a SAS address is assigned to an unused Phy (Step S13; Yes), the address expecting unit 313 determines that the HBA 21 that is connected to the Phy is a new HBA. The address expecting unit 313 then performs the SAS-address expecting process by using the SAS address of the target HBA 21 that is acquired by the address acquiring unit 312 (Step S14).

On the other hand, if it is determined that no SAS address is assigned to an unused Phy (Step S13; No), the physical-address acquiring unit 314 determines whether a SAS address (that is assigned to a used Phy) has been changed to an unexpected address (Step S15). In other words, the physical-address acquiring unit 314 determines whether a SAS address has been changed to a SAS address that is not included in the SAS addresses that are expected by the address expecting unit 313.

If it is determines that a SAS address has been changed to a SAS address that is not included in the expected SAS addresses (Step S15; Yes), the physical-address acquiring unit 314 performs a physical-address acquiring process to acquire the physical addresses of the target HBA 21 (Step S16). On the other hand, if it is determined that no SAS address has been changed to a SAS address that is not included in the expected SAS addresses (Step S15; No), i.e., it is determined that the change is included in the expectation, the physical-address acquiring unit 314 finishes the process.

Possible-Address Calculating Process According to the Embodiment

Figure 6:
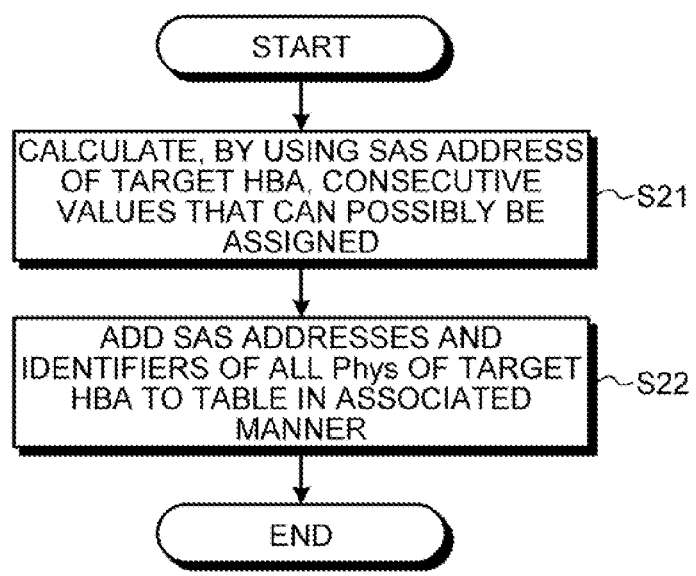
FIG. 6 is a flowchart of an address expecting process according to the embodiment.

The process of S14 of FIG. 5 will be explained below with reference to FIG. 6. FIG. 6 is a flowchart of an address expecting process according to the embodiment.

Firstly, the address expecting unit 313 calculates, by using the SAS address of the target HBA 21, consecutive values that can possibly be assigned to the same HBA (Step S21). For example, the address expecting unit 313 calculates 16 consecutive values (0000 to 1111) that correspond to the lower 4 bits of the SAS address of the target HBA 21.

Then, the address expecting unit 313 adds the calculated SAS addresses to the address management table 41 in such a manner that they are associated with all the Phys of the target HBA 21 (Step S22).

Physical-Address Acquiring Process According to the Embodiment

Figure 7:
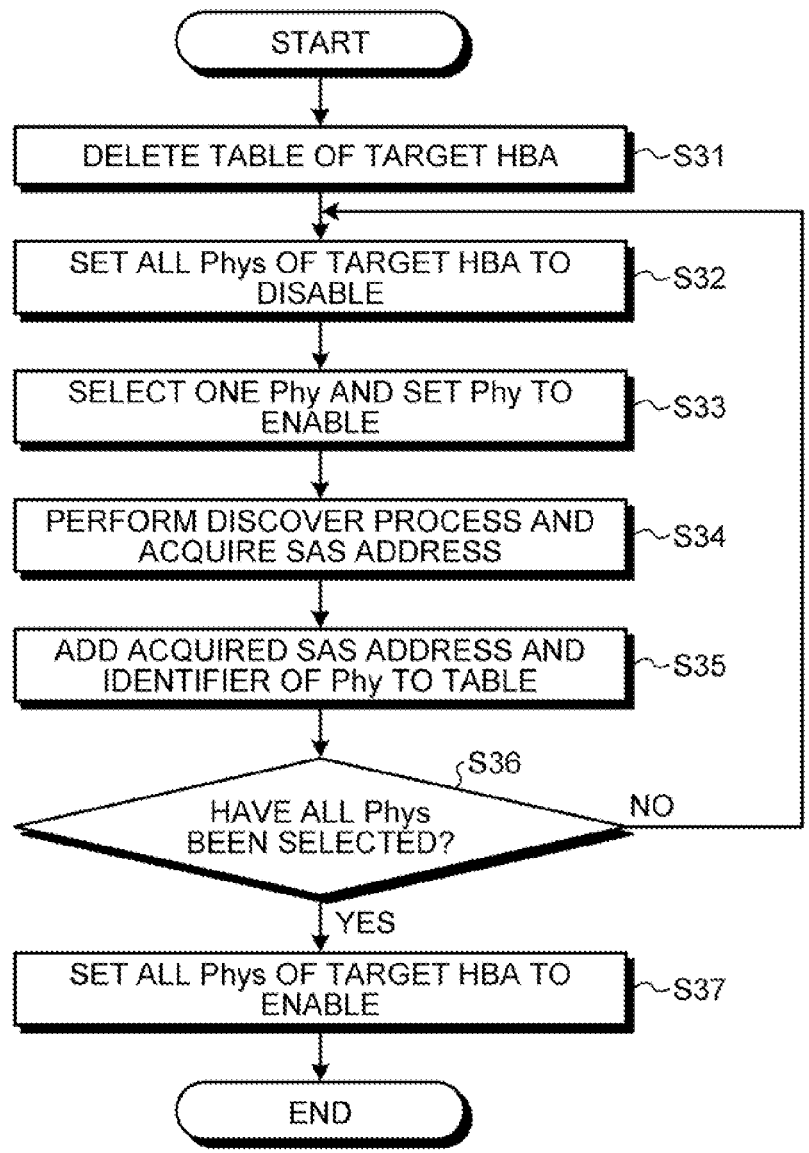
FIG. 7 is a flowchart of a physical-address acquiring process according to the embodiment.

The process of S16 of FIG. 5 will be explained below with reference to FIG. 7. FIG. 7 is a flowchart of a physical-address acquiring process according to the embodiment.

Firstly, the physical-address acquiring unit 314 deletes information about the target HBA 21 from the address management table 41 (Step S31). Then, the physical-address acquiring unit 314 sets all the Phys assigned with the SAS address of the target HBA 21 to invalid (Disable) (Step S32). For example, the physical-address acquiring unit 314 sets a Phy to invalid (Disable) or valid (Enable) by using a Phy control command based on the SMP (SAS Management Protocol).

Subsequently, the physical-address acquiring unit 314 sets one Phy to valid (Enable) (Step S33). In other words, the physical-address acquiring unit 314 sets the Phys to a quasi narrow link mode and then connects the Phys to the SAS switch 10 one by one. The physical-address acquiring unit 314 then performs the Discover process with the valid Phy, thereby acquiring the SAS address that is assigned to the Phy (Step S34). After that, the physical-address acquiring unit 314 adds both the acquired SAS address and the identifier of the Phy to the address management table 41 (Step S35).

Subsequently, the physical-address acquiring unit 314 determines whether all the Phys assigned with the SAS address of the target HBA 21 have been selected (Step S36). If it is determines that all the Phys have not been selected (Step S36; No), the physical-address acquiring unit 314 goes to Step S32 to select an unselected Phy.

On the other hand, if it is determines that all the Phys have been selected (Step S36; Yes), the physical-address acquiring unit 314 sets all the Phys of the target HBA to valid (Enable) (Step S37). In other words, the physical-address acquiring unit 314 switches the Phys from the quasi narrow link mode back to the wide link mode.

Figure 8:
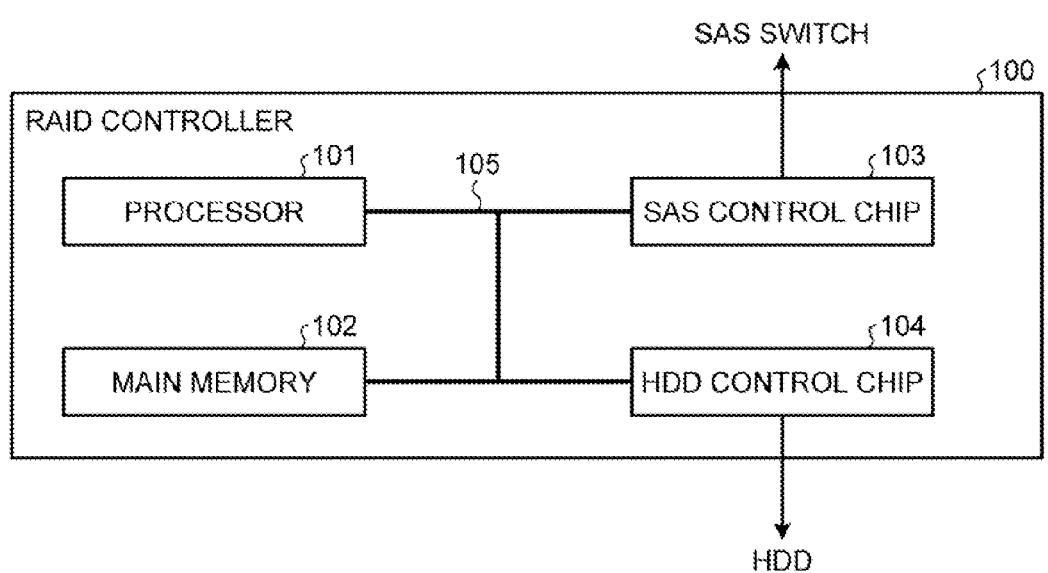
FIG. 8 is a diagram that illustrates an example of the hardware configuration of a RAID controller according to the embodiment.
Figure 9A:
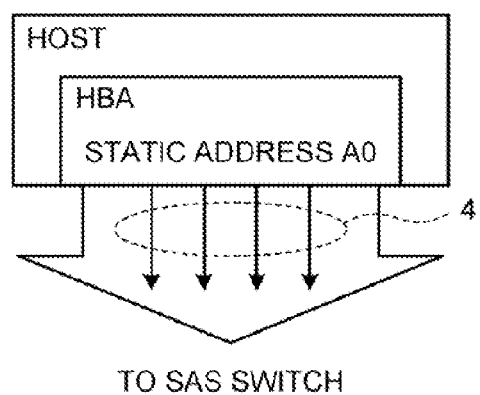
FIG. 9A is diagram that illustrates a static-address assigning HBA.
Figure 9B:
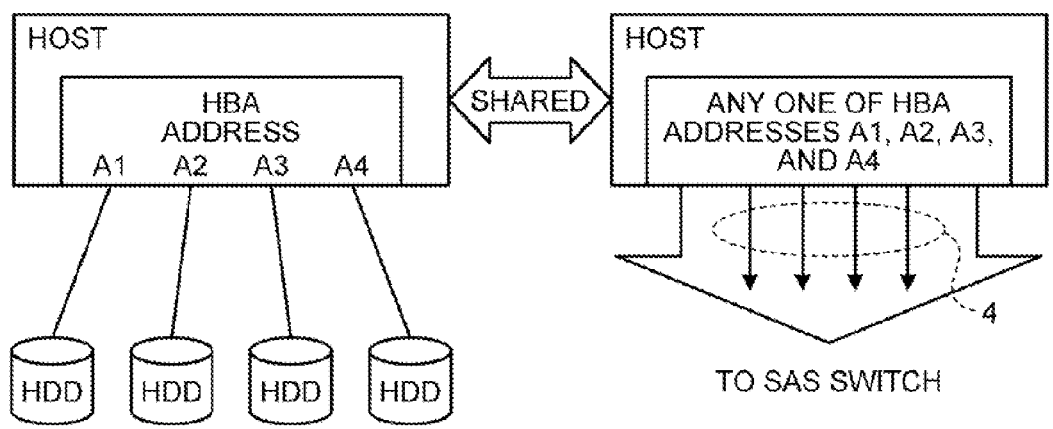
FIG. 9B is diagram that illustrates a wide/narrow HBA.

Example of Hardware Configuration of RAID Controller According to the Embodiment An example of the hardware configuration of a RAID controller 100 used in the storage device 1 will be explained below according to the embodiment with reference to FIG. 8. FIG. 8 illustrates an example of the hardware configuration of the RAID controller 100 according to the embodiment.

As illustrated in FIG. 8, the RAID controller 100 includes a processor 101, a main memory 102, a SAS control chip 103, and an HDD control chip 104. The processor 101, the main memory 102, the SAS control chip 103, and the HDD control chip 104 are connected to each other via a system bus 105. The SAS control chip 103 is connected to the SAS switch 10. The HDD control chip 104 is connected to the HDDs 50-1 to 50-n.

The main memory 102 stores therein a control process that has the same function as that of the control unit 30 illustrated in FIG. 1. The main memory 102 also stores therein management information that corresponds to the address management table 41 illustrated in FIG. 1. The processor 101 performs the control process by using the management information.

Effects Of The Embodiment

According to the above embodiment, the storage device 1 has a wide link in which any one of SAS addresses that a given host of the hosts 2 has is assigned to some of ports (Phys) that are connected to the host 2. The storage device 1 then detects a change in the state of any of the Phys. When a change is detected, the storage device 1 acquires SAS addresses that are assigned to the Phys. Moreover, the storage device 1 manages, in accordance with the acquired SAS addresses and the identification information for identifying the Phys, SAS addresses that the host 2, which is connected to some of the Phys, can possibly have. With this configuration, even if a SAS address of the wide link is changed, the storage device 1 can respond to the changed SAS address. In other words, even if a SAS address of the wide link is changed as the result of an action, such as the detachment or attachment of a cable, because the storage device 1 manages SAS addresses that the host 2 can possibly have, even after the SAS address is changed, it can respond to an input/output request received from the host 2.

Moreover, according to the above embodiment, the storage device 1 has the address management table 41 that stores therein SAS addresses that can possibly be assigned to Phys that are connected to the host 2 and the identifiers of the respective Phys. If a SAS address that is acquired when a change is detected is assigned to an unused Phy, the storage device 1 expects, in accordance with the SAS address, consecutive SAS addresses that the host 2 can possibly have. The storage device 1 then stores the expected SAS addresses in the address management table 41. With this configuration, if, for example, a given host of the hosts 2 is connected to a new Phy (unused Phy), the storage device 1 can manage consecutive values of the SAS addresses that the host 2 can possibly have as the defaults of the SAS address. Therefore, even if the SAS address of the wide link is changed to any of the consecutive values as the result of an action, such as the detachment or attachment of a cable, the storage device 1 can respond to the changed SAS address by using the managed SAS addresses.

Moreover, according to the above embodiment, when any unexpected SAS address that is assigned to a used Phy is found in the SAS addresses that are acquired when a change is detected, the storage device 1 acquires a SAS address that is physically assigned by the host 2 from each of the Phys that are assigned to the host 2. The storage device 1 stores the acquired physical SAS addresses of the respective Phys in the address management table 41. With this configuration, even if a SAS address of the wide link is changed as the result of an action, such as the detachment or attachment of a cable, because the storage device 1 manages SAS addresses to which the SAS address can be changed, it can respond to the changed SAS address.

Others

In the above embodiment, when an unexpected SAS address is assigned to a used Phy, the physical-address acquiring unit 314 acquires SAS addresses that are physically assigned by the HBA 21. However, the configuration is not limited thereto. The physical-address acquiring unit 314 can be configured to acquire, when a changed SAS address is assigned to a used Phy, SAS addresses that are physically assigned by the HBA 21.

Moreover, The constituent elements of the storage device 1 illustrated in the drawings need not be physically configured as illustrated. The constituent elements, as a whole or in part, can be separated or integrated based on an arbitrary unit either functionally or physically in accordance with various types of loads or use conditions. For example, the change detecting unit 311 and the address acquiring unit 312 can be integrated as one unit. Moreover, the address expecting unit 313 and the physical-address acquiring unit 314 can be integrated as one address management unit. The storage unit 40 can be an external device that is connected to the RAID controller 20 via a network.

Although, as illustrated in the accompanying drawings, the storage device 1 includes the SAS switch 10, the SAS switch 10 can be excluded therefrom. If the storage device 1 is not included in the SAS switch 10, the storage device 1 has the RAID controller 20 and the HDDs 50-1 to 50-n and is connected to the SAS switch 10 by using a SAS wide link.

The process functions performed by the RAID controller 20 can be entirely or partially realized by a CPU (or a micro computer, such as an MPU and an MCU (Micro Controller Unit)) or realized as hardware by wired logic. The process functions performed by the RAID controller 20 can be entirely or partially realized by programs that are analyzed and executed by the CPU (or a micro computer, such as an MPU and an MCU (Micro Controller Unit)).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage device that has a wide link in which any one of addresses that a server has is assigned to a plurality of connection ports that are connected to the server, the storage device comprising:
    a detecting unit that detects a change in the state of any port of the connection ports;
    an address acquiring unit that acquires, when a change is detected by the detecting unit, addresses that are assigned to the connection ports; and
    an address management unit that manages, in accordance with the addresses acquired by the address acquiring unit and with identification information for identifying the connection ports, an address that the plurality of connection-ports-connected-server can possibly have.

2. The storage device according to claim 1, further comprising a storage unit that stores therein both an address that can possibly be assigned to a connection port that is connected to the server and an identifier of the connection port,
    the address management unit including an address expecting unit that expects, when an address acquired by the address acquiring unit is assigned to an unused connection port, consecutive addresses that the server can possibly have in accordance with the address and then stores the expected addresses in the storage unit.

3. The storage device according to claim 2,
    the address management unit including a physical-address acquiring unit that acquires, when any unexpected address that is assigned to a used connection port is found in the addresses acquired by the address acquiring unit, an address that is assigned physically by the server for each of the connection ports that are connected to the server and then stores the acquired addresses of the connection ports in the storage unit.

4. A controller comprising:
    a processor; and
    a memory, wherein the processor executes:
    detecting a change in the state of any port of a plurality of connection ports that are assigned with any one of addresses that a server has;
    acquiring, when a change is detected by the detecting, addresses that are assigned to the connection ports; and
    storing, in accordance with the addresses acquired by the acquiring and with identification information for identifying the connection ports, an address that the plurality of connection-ports-connected-server can possibly have in the memory.

5. An address management method in which a storage device that is connected to a server manages a plurality of addresses that the server has, the address management method comprising:

- detecting a change in the state of any port of a plurality of connection ports that are assigned with any one of the addresses that the server has;
- acquiring, when a change is detected by the detecting, addresses that are assigned to the connection ports;
- expecting, when an address acquired by the acquiring is assigned to an unused connection port, consecutive addresses that the server can possibly have in accordance with the address and then storing the expected addresses and identifiers of the connection ports in a storage unit; and
- when any unexpected address that is assigned to a used connection port is found in the addresses acquired by the acquiring, acquiring an address that is assigned physically by the server for each of the connection ports that are connected to the server and then storing the acquired addresses of the connection ports and identifiers of the connection ports in the storage unit.

* * * * *